US006809454B2

United States Patent
Adachi

(10) Patent No.: US 6,809,454 B2
(45) Date of Patent: Oct. 26, 2004

(54) MOTOR HAVING BRUSH HOLDER WITH COMMUNICATION HOLE

(75) Inventor: Tadashi Adachi, Kosai (JP)

(73) Assignee: Asmo Co., Ltd., Shizuoka (JP)

( * ) Notice: Subject to any disclaimer, the term of this patent is extended or adjusted under 35 U.S.C. 154(b) by 71 days.

(21) Appl. No.: 10/292,622

(22) Filed: Nov. 13, 2002

(65) Prior Publication Data

US 2003/0102767 A1 Jun. 5, 2003

(30) Foreign Application Priority Data

Nov. 14, 2001 (JP) ......................................... 2001-349273

(51) Int. Cl.[7] .......................... H02K 13/00; H01R 39/38
(52) U.S. Cl. ........................ 310/239; 310/249; 310/251
(58) Field of Search ......................... 310/239, 240–248, 310/249, 251

(56) References Cited

U.S. PATENT DOCUMENTS 4,893,039 A * 1/1990 Isii ............................... 310/89
6,573,625 B2 * 6/2003 Shimizu et al. ............ 310/239

FOREIGN PATENT DOCUMENTS

JP A-H08-140311 5/1996 .......... H02K/5/167

* cited by examiner

Primary Examiner—Tran Nguyen
Assistant Examiner—J. Aguirrechea
(74) Attorney, Agent, or Firm—Posz & Bethards, PLC

(57) ABSTRACT

In a motor having a motor unit and a speed-reducing unit, a brush holder is sandwiched between a yoke housing of the motor unit and a gear housing of the speed-reducing unit. The brush holder includes holder body, joining portion, and connector portion. The holder body is formed with a first opening being open in the yoke housing. The joining portion is formed with a cylindrical portion extending in a direction same as the opening direction of a connector recessed portion of the connector portion. A second opening is formed on an end surface of the cylindrical portion. The first opening communicates with the second opening through first and second communication holes, so that pressure difference between the inside and outside of the yoke housing and the gear housing are cancelled.

12 Claims, 3 Drawing Sheets

MOTOR HAVING BRUSH HOLDER WITH COMMUNICATION HOLE

CROSS REFERENCE TO RELATED APPLICATION

This application is based on and claims the benefit of priority of Japanese Patent Application No. 2001-349273 filed on Nov. 14, 2001, the disclosure of which is incorporated herein by reference.

FIELD OF THE INVENTION

The present invention relates to a motor having a brush holder between a yoke housing and a gear housing.

BACKGROUND OF THE INVENTION

As a motor for a vehicular power window apparatus, a motor having a brush holder between a yoke housing and a gear housing is proposed. Because this kind of motor is generally installed in a door, it is easily soaked or covered with water.

During a motor operation, the temperature inside the motor rises. After the motor is turned off, the inside of the motor is cooled and the inside pressure of the motor begins to be negative pressure. At this time, if the motor is covered with water, the water is sucked into the motor through the connecting portions between the yoke housing, gear housing, and brush holder. Further, the water is likely to be stored in the motor. As a result, functional components in the motor, such as a bearing, are rusted, thereby causing defects to the motor operation.

Therefore, it is required to protect the motor from the water. For example, a breathing hole is formed on the yoke housing or the gear housing. With this, because pressure difference between the inside and outside of the motor is decreased through the breathing hole, entering of the water is suppressed even when the motor is covered with the water.

In this case, however, the breathing hole is closed with the water, depending on the position or opening direction of the breathing hole. As a result, the breathing hole does not operate properly and the water enters the motor form the breathing hole. Therefore, it is required to design the breathing hole without being covered with the water.

Because mounting positions of the motor are different depending on the types of vehicles, it is required to change the opening direction of the breathing hole in correspondence with the change of the mounting position of the motor. Also, preparing various yoke housings and gear housings in which breathing holes are formed in different directions causes disadvantages in costs and production.

Instead of changing the direction of the breathing hole in correspondence with the mounting position of the motor, it is proposed to cover the breathing hole with waterproof sheets to protect from the water. In this case, since it is not required to change the direction of the breathing hole, the direction of the breathing hole is standardized. However, since the waterproof sheet is required additionally, the number of parts is increased.

SUMMARY OF THE INVENTION

The present invention is made in view of the above disadvantages and an object of the present invention is to standardized parts of a motor and to decrease the number of the parts.

According to the present invention, a motor has a yoke housing rotatably enclosing an armature and a brush holder for holding brushes to slide-contact with the armature. The yoke housing is formed into a substantially cylindrical shape having a closed end at a side and an open end at an opposite side. The brush holder is fixed to the yoke housing to close the open end.

The brush holder is formed with a first opening being open toward the inside of the yoke housing, a second opening being open to the outside of the yoke housing, and a communication hole communicating between the first opening and the second opening inside the brush holder.

In the motor, when the pressure inside the yoke housing begins to be negative pressure after a motor operation, the outside air is sucked into the yoke housing from the second opening through the communication hole. Therefore, the negative pressure inside the yoke housing is cancelled.

According to the present invention, parts can be standardized and reduced. Also, manufacturing costs can be decreased and products efficiency is improved. Further, designing flexibility is improved.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Figure 1:
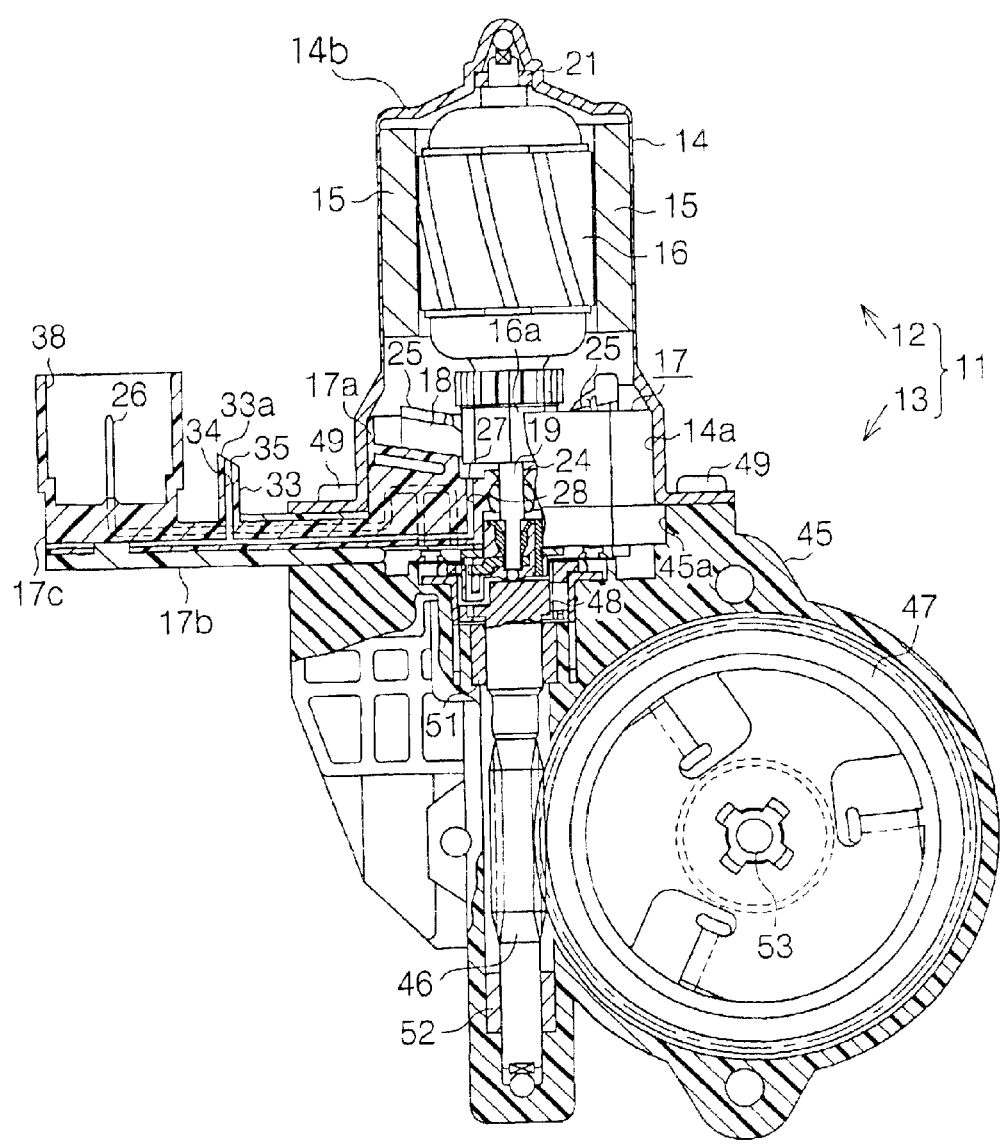
FIG. 1 is a cross-sectional view of a motor according to the first embodiment of the present invention.
Figure 2:
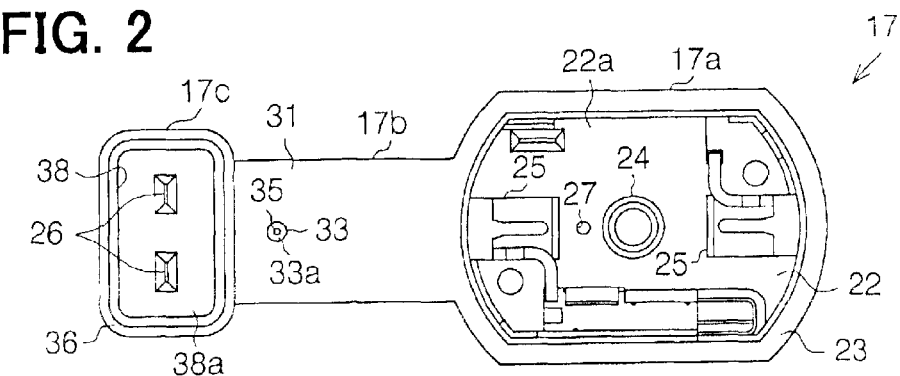
FIG. 2 is a plan view of a brush holder according to the first embodiment of the present invention.
Figure 3:
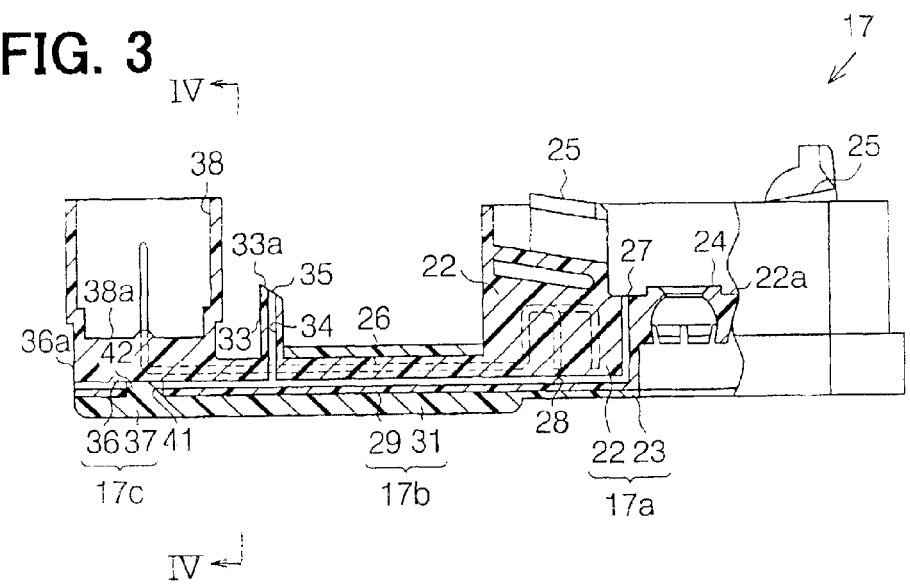
FIG. 3 is a schematic view of the brush holder, partially including a cross-section, according to the first embodiment of the present invention.
Figure 4:
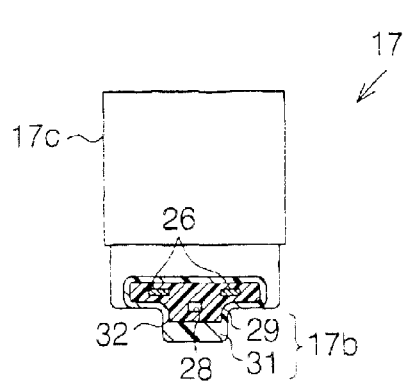
FIG. 4 is a cross-sectional view of a brush holder taken along a line IV—IV in FIG. 3.

A preferred embodiment of the present invention is described hereinafter with reference to drawings. FIG. 1 is a schematic cross-sectional view of a motor 11. FIG. 2 is a plan view of a brush holder 17. FIG. 3 is a side view of the brush holder 17, partially including a cross-section. FIG. 4 is a cross-sectional view of the brush holder 17 taken along a like IV—IV in FIG. 3.

As shown in FIG. 1, the motor 11 is used to produce a driving source for a power window apparatus of a vehicle. The motor 11 has a motor unit 12 and a speed-reducing unit 13. The motor unit 12 has a yoke housing 14, a pair of magnets 15, an armature 16, the brush holder 17, and a pair of brushes 18.

The yoke housing 14 is formed into a substantially oblate cylindrical shape having a base (closed end) 14b at an end and an opening (open end) 14a at the other end. The pair of magnets 15 is fixed to an inner peripheral surface of the yoke housing 14 and is opposite to each other. The armature 16 is rotatably provided in the inner periphery of the magnets 15.

The armature 16 has a rotary shaft 19. One end (upper end in FIG. 1) of the rotary shaft 19 is rotatably supported by a bearing 21 provided at a middle portion of the base 14b of the yoke housing 14.

The brush holder 17 is fixed to the opening 14a of the yoke housing 14. The brush holder 17 includes a holder body 17a, a joining portion 17b, and a connector portion 17c. The joining portion 17b extends from the holder body 17a in a radially outward direction of the armature 16. The connector portion 17c is joined to the holder body 17a through the joining portion 17b, in a longitudinal direction (left and right direction in FIG. 3) of the brush holder 17. The connector portion 17c is a connector to receive electric power supply.

The holder body 17a has a shape to fit in the opening 14a to close the opening 14a. As shown in FIGS. 2 and 3, the holder body (holding portion) 17a includes a holder body resinous portion 22 and a holder body cover portion 23. The holder body cover portion 23 covers the outer periphery of the lower portion (lower side in FIG. 3) of the holder body resinous portion 22. The holder body cover portion 23 is a covering member and made of such as rubber, elastomer and viscous resin. The holder body cover portion 23 is integrally formed with the holder body resinous portion 22 by double-shot molding.

A bearing support portion 24 is formed in a substantially middle portion of the holder body resinous portion 22. The bearing support portion 24 is formed into a substantially cylindrical shape and rotatably supports a predetermined portion of the rotary shaft 19. A pair of brush holding portions 25 is formed on a surface 22a of the holder body resinous portion 22, which faces the yoke housing 14. The brush holding portions 25 are arranged on both sides of the bearing support portion 24 in the longitudinal direction of the brush holder 17. The bearing support portion 24 is located between the pair of the brush holding portions 25. As shown in FIG. 1, the brushes 18 having substantially rectangular shapes are accommodated in the brush holding portions 25, respectively. Also, as shown in FIG. 3, two terminals 26 for supplying electricity are inserted in the holder body resinous portion 22. The terminals 26 are electrically connected to the brushes 18.

A first opening 27 is formed on the surface 22a of the brush holder resin portion 22. The first opening 27 is open toward the inside of the yoke housing 14. The first opening 27 is located between the bearing support portion 24 and one of the brush holding portions 25, which is adjacent to the joining portion 17b. A first communication hole 28 is formed in the holder body resinous portion 22 to communicate from the first opening 27 into the joining portion 17b. The first communication hole 28 extends in parallel to the rotary shaft 19 from the first opening 27 and bent at a right angle in the holder body resinous portion 22 to extend toward the joining portion 17b.

The joining portion 17b includes a joining resinous portion 29 and a joining cover portion 31. The joining resinous portion 29 is integrally made with the holder body resinous portion 22. The joining cover portion 31 is integrally made with the holder body cover portion 23. The joining cover portion 31 is integrally formed with the joining resinous portion 29 by double-shot molding to entirely cover the outer periphery of the joining resinous portion 29. The terminals 26, which are inserted in the holder body resinous portion 22, are continuously inserted in the joining resinous portion 29 in the radial direction of the armature.

The first communication hole 28 is formed to extend from the holder body resinous portion 22 into the joining resinous portion 29. As shown in FIG. 3, the first communication hole 28 is formed into a line extending in the radial direction of the armature 16 and parallel to the terminals 26, in the joining resinous portion 29. Further, as shown in FIG. 4, the joining resinous portion 29 has a step portion 32 protruding toward the speed-reducing unit 13. The first communication hole 28 is located in the step portion 32.

As shown in FIG. 3, the joining resinous portion 29 has a cylindrical portion (protrusion) 33. The cylindrical portion 33 protrudes in a top direction in FIG. 3, that is, toward the yoke housing 14 in parallel to the rotary shaft 19. A second communication hole 34 is formed in the cylindrical portion 33. The second communication hole 34 extends parallel to the rotary shaft 19 and communicates with the first communication hole 28 in the joining resinous portion 29. An end surface (top end in FIG. 3) 33a of the cylindrical portion 33 is sloped with respect to a longitudinal direction of the second communication hole 34 so that a second opening 35 is formed into an elliptic shape on the end surface 33a.

The connector portion 17c includes a connector resinous portion 36 and a connector cover portion 37. The connector resinous portion 36 is integrally made with the joining resinous portion 29. The connector cover portion 37 is integrally made with the joining cover portion 31. The connector resinous portion 36 has a connector recessed portion 38 to which an external connector (not shown) is connected. The connector portion 17c is open toward the yoke housing 14, that is, to the top side in FIG. 3. The terminals 26, which extend continuously from the joining resinous portion 29, are inserted in the connector resinous portion 36. The ends of the terminals 26 protrude from a bottom wall 38a in the opening direction of the connector portion 17c, in the connector recessed portion 38. The connector portion 17c is open in the same direction as the longitudinal direction of the cylindrical portion 33 of the joining resinous portion 29.

The first communication hole 28 is formed to extend into the connector resinous portion 36 continuously from the joining resinous portion 29. The first communication hole 28 penetrates through the connector resinous portion 36 to a side surface 36a, which is on the opposite side to the joining portion 17b. A through hole 41 is formed in the connector resinous portion 36 so that the first communication hole 28 is diverged to the speed-reducing portion 13 side in a halfway through the first communication hole 28.

The connector cover portion 37 is integrally formed with the connector resinous portion 36 by double-shot molding to cover the base (lower portion in FIG. 3) of the connector resinous portion 36. The connector cover portion 37 is formed with a projection 42 on a surface facing the connector resinous portion 36. The projection 42 has a shape corresponding to the through hole 41, so that the projection 42 is fitted in the through hole 41 to close the first communication hole 28. Therefore, the first communication hole 28 communicates between the first opening 27 and the second opening 35.

As shown in FIG. 1, the speed-reducing unit 13 has gear housing 45, worm shaft 46, worm wheel 47 and clutch 48. The gear housing 45 is made of resin and encloses the worm shaft 46, worm wheel 47 and clutch 48 therein. The gear housing 45 has an opening 45a opposing to the opening 14a of the yoke housing 14. The brush holder 17 is sandwiched between the opening 14a of the yoke housing 14 and the opening 45a of the gear housing 45. In this state, the yoke housing 14 and the gear housing 45 are fastened together with screws 49. When fastening with the screws 49, the holder body cover portion 23 is elastically deformed by being sandwiched between the yoke housing 14 and the gear housing 45, so that the connecting portions between the gear housing 45 and the holder body 17a are sealed. That is, the cover portions 23, 29 that contact with the yoke housing 14 and gear housing 45 function as sealing members.

The worm shaft 46 is rotatably supported by bearings 51, 52 provided in the gear housing 45 at the predetermined positions. The worm shaft 46 is communicated with the rotary shaft 19 extending from the motor unit 12 through the clutch 48.

The worm shaft 46 is engaged with the worm wheel 47. The worm wheel 47 is communicated with an output shaft 53, which is perpendicular to the worm shaft 46. The output shaft 53 is communicated with a well-known regulator (not shown) for opening and closing a window glass (not shown). With the rotation of the output shaft 53, the regulator is driven so that the window glass is opened and closed.

In the motor 11, when an electric current is supplied to the terminals 26 from the external connector (not shown), the electric current is supplied to the brushes 18 through the terminals 26 inserted in the resinous portions 22, 29, 36 of the brush holder 17. The electric power is then supplied into a coil winding wound around the armature 16 through a commutator 16a that slide-contacts with the brushes 18. Thus, the armature is driven, that is, the rotary shaft 19 is rotated. The rotation of the rotary shaft 19 is transmitted to the output shaft 53 through the clutch 48, worm shaft 46, and worm wheel 47.

With the rotations of the rotary shaft 19 and the worm shaft 46, the temperatures inside the motor unit 12 and the speed-reducing unit 13 rise. After the motor operation is turned off, when the inside of the motor 11 is gradually cooled, the inside pressures of the yoke housing 14 and the gear housing 45 begin to be negative pressure. At this time, outside air is sucked into the second communication hole 34 from the second opening 35, which is located outside the yoke housing 14. After passing through the second communication hole 34 and the first communication hole 28, the air is discharged from the first opening 27 into the yoke housing 14. Therefore, the negative pressure in the yoke housing 14 is cancelled. Further, the air flows from the yoke housing 14 into the gear housing 45 through the bearing support portion 24. Therefore, the negative pressure in the gear housing 45 is also cancelled. Accordingly, it is decreased that the inside of the motor unit 12 and the speed-reducing unit 13 are maintained under negative pressure. Even if the motor 11 is soaked in or covered with the water during the motor operation, entering of the water from the connecting portions, such as between the motor unit 12, speed-reducing unit 13 and brush holder 17, can be decreased.

Next, characteristic advantages of the above-described embodiment are described hereinafter.

(1) The brush holder 17 of the motor 11 has the first opening 27, first communication hole 28, second communication hole 34 and second opening 35.

With this, the inside pressures of the yoke housing 14 and the gear housing 45 are controlled with the openings 27, 35 and communication holes 28, 34. That is, even when the inside of the yoke housing 14 and the gear housing 45 begin to be negative pressure after the operation of the motor 11, outside air is sucked into the yoke housing 14 and the gear housing 45 through the openings 27, 35 and communication holes 28, 34, thereby canceling the negative pressure.

Therefore, it is not required to form breathing holes on the housings 14, 45 to cancel the negative pressure and to provide a waterproof sheet. Because parts of the yoke housing 14 and the gear housing 45 are standardized, the number of the parts can be reduced. Accordingly, manufacturing costs are decreased and production efficiency is improved.

Since the breathing holes are not required on the yoke housing 14 and the gear housing 45, spaces for installing parts, such as an ECU, can be enlarged. Therefore, designing flexibility is improved.

(2) The first communication hole 28 is formed into a line through the joining resinous portion 29 and the connector resinous portion 36.

Therefore, the first communication hole 28 is easily formed with a molding die, such as a straight pin.

(3) The cylindrical portion 33 is formed on the joining portion 17b of the brush holder 17. The cylindrical portion 33 protrudes from the joining portion 17b in the same direction as the opening direction of the connector recessed portion 38. The second opening 35 is formed on the end surface 33a of the cylindrical portion 33.

The connector portion 17c is generally formed in the direction to be protected from the water. Since the cylindrical portion 33 having the second opening 35 is formed to extend in the direction same as the connector portion 17c, the second opening 35 is prevented from being covered with the water. When the designs of the connector portion 17c and the cylindrical portion 33a are changed in correspondence to the change of a mounting position of the motor 11, the opening direction of the connector portion 17c and the extending direction of the cylindrical portion 33 can be changed together. Therefore, standardization of the brush holder 17 becomes easy. Accordingly, manufacturing costs are reduced and production efficiency is improved.

(4) The terminals 26 are integrally provided in the brush holder 17 by insert molding. The terminals 26 are parallel to the first communication hole 28 in the joining portion 17b of the brush holder 17.

With this, the first communication hole 28 does not overlap or cross with the terminals 28 in the brush holder 17. Therefore, functions of the terminals 26 are not interrupted with the first communication hole 28.

(5) The end surface 33a of the cylindrical portion 33 on the joining portion 17b is slanted with respect to the longitudinal direction of the second communication hole 34, so that the second opening 35 is formed into the elliptic shape.

With this, because an opening area of the second opening 35 is enlarged, the second opening 35 is restricted from being closed such as with a drop of water.

The present embodiment can be modified as follows.

Figure 5:
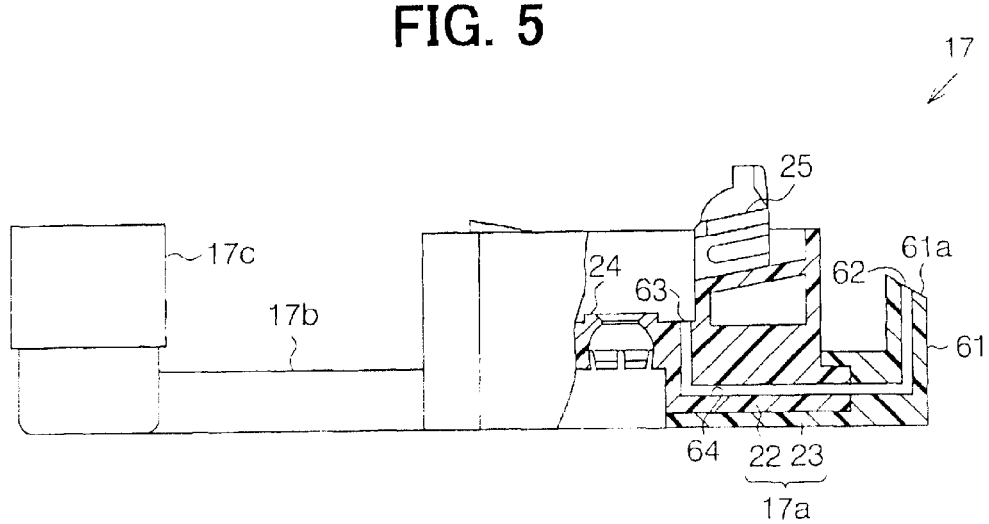
FIG. 5 is a schematic view of a brush holder, partially including a cross-section, according to a modified embodiment of the present invention.

In the above embodiment, the cylindrical portion 33 having the second opening 35 is formed on the joining portion 17b that is between the holder body 17a and the connector portion 17c. Alternatively, as shown in FIG. 5, a cylindrical portion 61 can be formed in the holder body cover portion 23 of the holder body 17a on the opposite side to the connector portion 17c. Also, a second opening 62 is formed on an end surface 61a of the cylindrical portion 61. In this case, a first opening 63 is provided between the brush holder 25, which is adjacent to the cylindrical portion 61, and the bearing support portion 24. Also, a third communication hole 64 communicating between the first opening 63 and the second opening 62 are formed in the holder body resinous portion 22.

Figure 6:
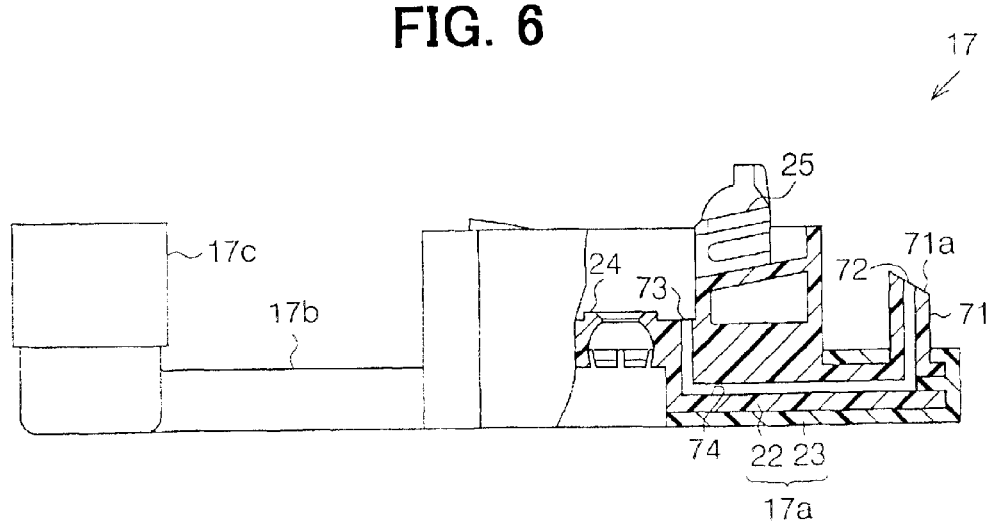
FIG. 6 is a schematic view of a brush holder, partially including a cross-section, according to another modified embodiment of the present invention.

In the above embodiment, the second opening 35 is formed in the joining portion 17b. Alternatively, as shown in FIG. 6, a cylindrical portion 71 can be provided on the holder body resinous portion 22 of the holder body 17a on the opposite side of the connector portion 17c. A second opening 72 can be formed on an end surface 71a of the cylindrical portion 71. In this case, a first opening 73 is provided between the brush holding portion 25, which is adjacent to the cylindrical portion 71, and the bearing support portion 24. The third communication hole 74 communicating between the first opening 73 and the second opening 72 can be formed in the holder body resinous portion 22.

In the above embodiment, the brush holding portions 25 are arranged on the both sides of the bearing support portion 24 along the longitudinal direction of the joining portion 17b. However, the position of the brush holding portions 25 can be changed. For example, the brush holding portions 25 are shifted in the rotational direction of the armature 16 at 18 degrees or 36 degrees, with respect to the longitudinal direction of the joining portion 17b.

With this, positions of the first opening 27 and brush holding portions 25 can be changed in the rotational direction of the armature 16. Therefore, designing flexibility of the first opening portion 27 is improved.

In the above embodiment, the brush holder 17 has the holder body 17a, joining portion 17b, and connector portion 17c. However, the brush holder having another structure can be used. For example, the brush holder 17 only having the holder body 17a can be used. In this case, the joining portion 17b and connector portion 17c are eliminated from the brush holder 17 shown in FIG. 5. The inside of the yoke housing 14 communicates with the outside through the first opening 63, third communication hole 64 and second opening portion 62.

In the above embodiment, the motor 11 has the speed-reducing unit 13. However, the brush holder 17 can be used in a motor having different structure, such as a motor without the speed-reducing unit 13.

The present invention should not be limited to the disclosed embodiments, but may be implemented in other ways without departing from the spirit of the invention.

What is claimed is:

1. A motor comprising:
    a yoke housing having a substantially cylindrical shape having a first end and a second end, the first end being closed and the second end being open;
    an armature rotatably housed in the yoke housing;
    brushes for supplying electric power to the armature; and
    a brush holder for holding the brushes such that the brushes slide-contact with the armature, wherein:
        the brush holder is fixed to the yoke housing to close the second end; and
        the brush holder includes:
            a holding portion that holds the brushes inside of the yoke housing;
            a connector portion located outside of the yoke housing for receiving electric power; and
            a joining portion joining the holding portion and the connector portion in a longitudinal direction of the brush holder; and
        the brush holder defines a first opening, which is open toward the inside of the yoke housing, a second opening, which is open to the outside of the yoke housing, and a communication hole communicating from the first opening to the second opening inside the brush holder and;
    terminals for supplying electric power to the brushes, wherein the terminals are integrally provided in the brush holder by insert molding, and the communication hole is parallel to the terminals in the joining portion.

2. The motor according to claim 1, wherein the brush holder is formed of resin.

3. The motor according to claim 1, wherein the brush holder has a resinous portion and a sealing portion disposed to cover the resinous portion, wherein the sealing portion seals a contact portion between the yoke housing and the brush holder.

4. The motor according to claim 1, wherein the brush holder has a resinous portion and a cover portion disposed to surround the resinous portion, wherein the cover portion defines the second opening.

5. The motor according to claim 1, wherein the holding portion defines the first opening.

6. The motor according to claim 5, wherein the second opening is located on a side opposite to the connector portion with respect to the holding portion.

7. The motor according to claim 5, wherein the joining portion is located outside the yoke housing and defines the second opening.

8. The motor according to claim 5, wherein the connector portion forms a recessed portion opening in a direction substantially perpendicular to the longitudinal direction of the brush holder, and the joining portion forms a protrusion protruding in a substantially same direction as the opening direction of the recessed portion of the connector portion, wherein the protrusion defines the second opening on its end surface.

9. The motor according to claim 8, wherein the end surface of the protrusion is slanted with respect to a longitudinal direction of the protrusion.

10. The motor according to claim 1, further comprising a speed-reducing unit for reducing a rotational speed of the armature, wherein the speed-reducing unit has a gear housing, and the brush holder is sandwiched between the yoke housing and the gear housing.

11. The motor according to claim 1, wherein the joining portion forms a step portion projecting in an axial direction of the armature and extending in a radial direction of the armature, and the communication hole is located in the step portion.

12. A motor comprising:
    a yoke housing having a substantially cylindrical shape having a first end and a second end, the first end being closed and the second end being open;
    an armature rotatably housed in the yoke housing;
    brushes for supplying electric power to the armature; and
    a brush holder for holding the brushes such that the brushes slide-contact with the armature, wherein the brush holder is fixed to the yoke housing to close the second end, and wherein the brush holder defines a first opening being open toward the inside of the yoke housing, a second opening being open to the outside of the yoke housing, and a communication hole communicating from the first opening to the second opening inside the brush holder, wherein the brush holder includes:
        a holding portion for holding the brushes, wherein the holding portion defines the first opening;
        a connector portion for receiving electric power, wherein the connector portion forms a recessed portion opening in a direction substantially perpendicular to a longitudinal direction of the brush holder; and
    a joining portion joining the holding portion and the connector portion in a longitudinal direction of the brush holder, wherein the joining portion forms a protrusion protruding in substantially the same direction as the opening direction of the recessed portion of the connector portion, wherein the protrusion defines the second opening on its end surface, and the end surface of the protrusion is slanted with respect to a longitudinal direction of the protrusion.

* * * * *